Feb. 16, 1932. J. LITSCHGE 1,845,882
HOSE COUPLING
Filed Dec. 15, 1930
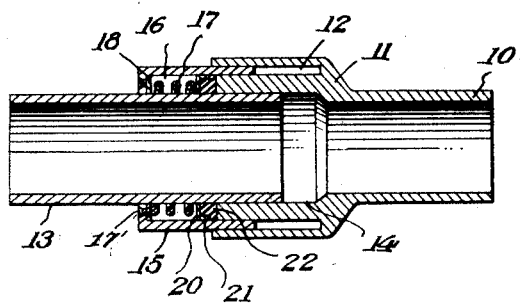
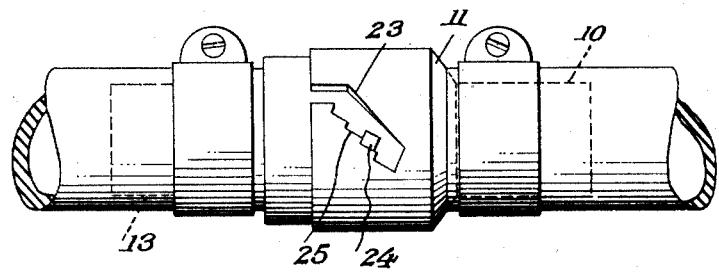
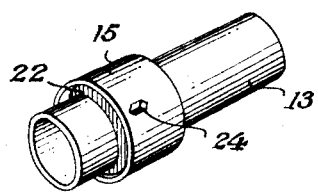
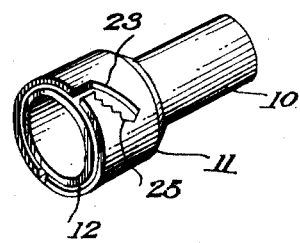
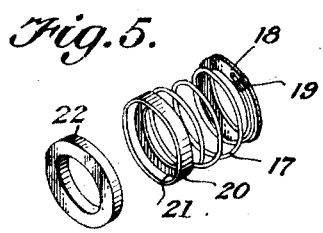
Joseph Litschge
INVENTOR
BY Victor J. Evans
ATTORNEY Patented Feb. 16, 1932

1,845,882

UNITED STATES PATENT OFFICE

JOSEPH LITSCHGE, OF WILKINSBURG, PENNSYLVANIA

HOSE COUPLING

Application filed December 15, 1930. Serial No. 502,536.

This invention relates to hose couplings and more particularly to the pneumatic type.

One of the principal objects of the invention consists of an effective locking form of adjustable bayonet slot connection for the coupling.

An additional object of the invention contemplates the provision and arrangement of an auxiliary telescopic connection for the joint to facilitate aligning the joint sections and to obviate leakage.

More specifically stated the auxiliary connection provides a pocket for the accommodation of a yieldably seated washer cooperating with the adjustable connection in the exercise of different degrees of tension at the connection pursuant to the pressure to be withstood.

With the above and other objects in view, the invention further consists of the following novel features and details of construction, to be hereinafter more fully described, illustrated in the accompanying drawings and pointed out in the appended claims.

In the drawings:

Figure 1 is a longitudinal sectional view taken through the completed joint.

Figure 2 is a side elevation of the coupling particularly illustrative of the adjustable locking form of bayonet slot connection.

Figures 3 and 4 are perspective views of the joint sections.

Figure 5 is a perspective view of the washer and spring mounting therefor.

Referring to the drawings in detail wherein like characters of reference denote corresponding parts, the reference character 10 indicates one of the tubular sections of my novel form of coupling provided with an enlargement 11 upon the outer side and circumferentially thereof. Said enlargement is provided with an annular channel or recess 12 projected in parallelism to that of the bore of the tubular member 10. The section 13 of the coupling has its innermost end projected within a counter bore 14 adjacent the outermost end of the section 10 and for telescopic association therewith whereby the bores of the sections 10 and 13 will be aligned.

An annular wall 15 having its outermost periphery inwardly struck for connection with the outer surface of the section 13, is projected at its opposite end within the annular groove or recess 12, substantially as illustrated in Figure 1 of the drawing. The annular wall 15 defines a pocket 16 between the inner side thereof and the adjacent outer surface of the section 13 within which a compression spring 17 is confined. A retaining washer 18 bearing against the inner side of the inwardly struck end of the annular wall 15 and secured thereto by fastening elements 17', carries a loop 19 for anchoring the adjacent end convolution of the compression spring 17 thereto. The other end convolution of the spring is correspondingly secured to the adjacent surface of a washer 20 having a flanged periphery 21 for the accommodation of a packing washer 22. The exposed surface of the packing washer is disposed for abutting engagement with the inner wall of the enlargement 11 projecting within the entrance of the pocket 16. The outer wall of the enlargement 11 is provided with slots 23 inwardly directed from the peripheral edge of the latter mentioned wall and in communication with the annular pocket or recess 12. Pin members 24 carried by and outwardly projected upon diametrically opposite sides of the annular wall 15 are designed for accommodation within the slots 23. The walls of the slots 23 against which the pins 24 are thrust by the tension of the spring 17 are provided with spaced toothed pockets 25 within which the pins 24 are lodged. In this manner, the coupling is rendered adjustable to withstand different pressures.

The invention is susceptible of various changes in its form, proportions and minor details of construction and the right is herein reserved to make such changes as properly fall within the scope of the appended claims.

Having described the invention, what is claimed is:

1. A hose coupling comprising male and female sections disposed in telescopic association, an enlargement upon the outer side of the female section about the telescopic connection having an annular recess, an annular wall carried upon the outer side and in spaced relation to the male section receivable within the annular recess, a compresssion spring disposed within the space defined between the annular wall and male section, a packing washer yieldably retained by the spring against the adjacent end of the enlargement, and an adjustable bayonet slot connection established between the annular wall and enlargement.

2. A hose coupling comprising male and female sections, an enlargement formed on the female section and having an annular recess, a cylindrical wall carried by the male section and receivable within the annular recess, a locking connection between the enlargement and cylindrical wall, and means yieldably seating the female member inwardly of the recess between the male section and the cylindrical wall.

In testimony whereof I affix my signature.

JOSEPH LITSCHGE.